(12) United States Patent
Popov et al.

(10) Patent No.: US 11,694,717 B1
(45) Date of Patent: Jul. 4, 2023

(54) DATA STORAGE DEVICE WITH ADAPTIVE WRITE POLICY AND ENHANCED LONGEVITY

(71) Applicant: WESTERN DIGITAL TECHNOLOGIES, INC., San Jose, CA (US)

(72) Inventors: Zarko Popov, Mission Viejo, CA (US); Wayne H. Vinson, Longmont, CO (US); Ryoheita Hattori, Zama (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/829,653

(22) Filed: Jun. 1, 2022

(51) Int. Cl.
| | | |
|---|---|---|
| *G11B 7/00* | (2006.01) | |
| *G11B 5/60* | (2006.01) | |
| *G11B 5/00* | (2006.01) | |

(52) U.S. Cl.
CPC .... *G11B 5/6029* (2013.01); *G11B 2005/0021* (2013.01)

(58) Field of Classification Search
CPC ..... G11B 7/1267; G11B 7/00; G11B 7/00736; G11B 7/1263; G11B 20/10009; G11B 20/10481; G11B 5/6029; G11B 5/59627; G11B 27/36; G06F 3/0619; G06F 3/0653; G06F 3/0659; G06F 3/0676
USPC .................................. 360/48, 55, 31, 78.08
See application file for complete search history.

(56) References Cited

U.S. PATENT DOCUMENTS

| | | | |
|---|---|---|---|
| 7,012,771 B1 | 3/2006 | Asgari et al. | |
| 7,522,366 B2 | 4/2009 | Mettler et al. | |
| 8,711,499 B1 | 4/2014 | Desai et al. | |
| 9,099,155 B1 | 8/2015 | Kataria et al. | |
| 9,230,605 B1 * | 1/2016 | Moser | G11B 5/012 |
| 9,830,107 B2 | 11/2017 | Blount | |
| 10,943,620 B1 | 3/2021 | Vinson et al. | |
| 2021/0089226 A1 | 3/2021 | Swaminathan et al. | |

OTHER PUBLICATIONS

Improved Adjacent Track Interference Test (WATI 2) https://www.guzik.com/product/improved-adjacent-track-interference-test-wati-2/, 2016, 2 pages.

(Continued)

*Primary Examiner* — Nabil Z Hindi
(74) *Attorney, Agent, or Firm* — Calderon Safran & Cole PC

(57) ABSTRACT

Illustrative aspects are directed to a data storage device comprising one or more disks; an actuator mechanism comprising one or more heads, and configured to position a head proximate to a disk surface; and one or more processing devices. The one or more processing devices are configured to: measure a read quality of a location on the disk surface; modify a refresh frequency for performing refresh writes at the location, based on the read quality at the location; in response to the refresh frequency at the location becoming stabilized, determine an integrated track interference (xTI) per write metric at the location; and, in response to determining that the xTI per write metric at the location is below a threshold for the xTI per write metric, modify an operating parameter of the head at the location to improve a longevity metric.

20 Claims, 5 Drawing Sheets

(56) References Cited

OTHER PUBLICATIONS

Zhang et al.—Mellow Writes: Extending Lifetime in Resistive Memories through Selective Slow Write Backs http://people.cs.uchicago.edu/~ftchong/papers/ISCA-16-mellow.pdf, 2016 ACM/IEEE 43rd Annual International Symposium on Computer Architecture (ISCA), 2016, pp. 519-531, doi: 10.1109/ISCA.2016.52, 13 pages.

* cited by examiner

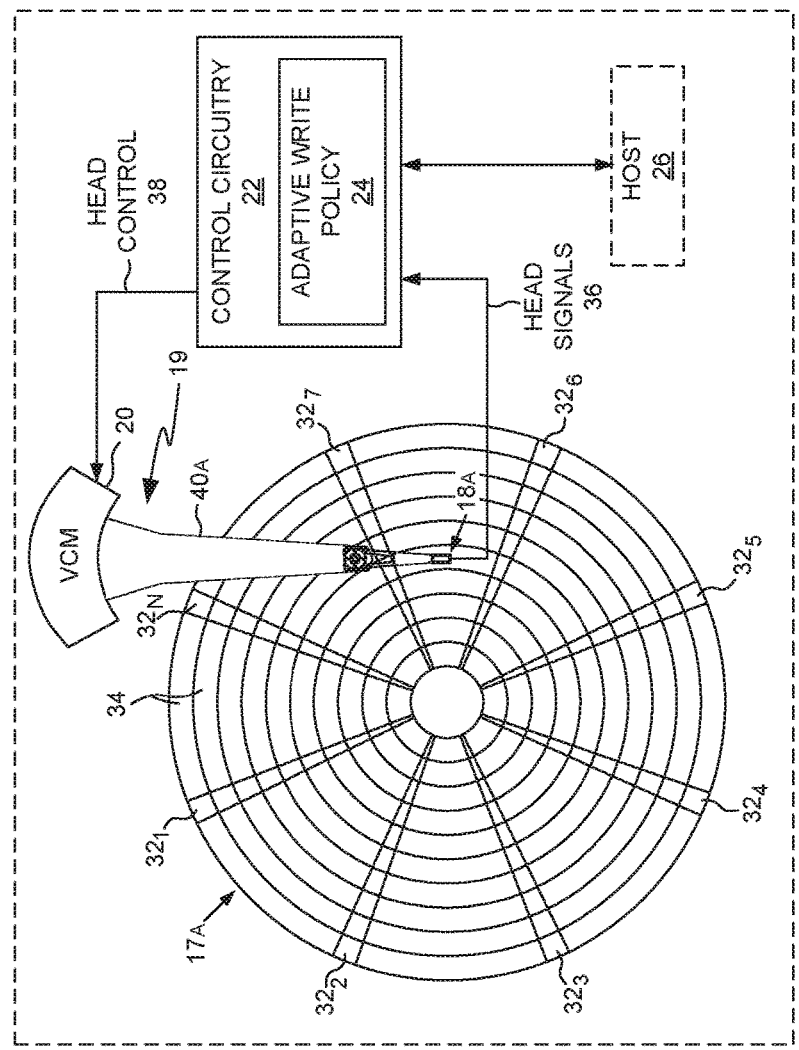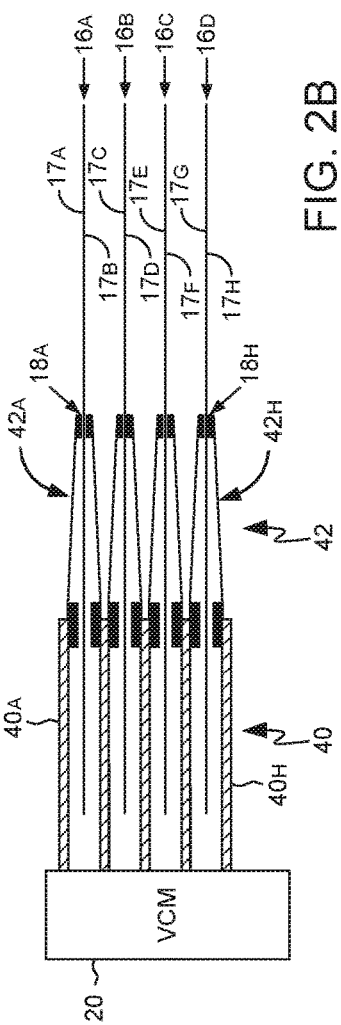
FIG. 2A
FIG. 2B

DATA STORAGE DEVICE WITH ADAPTIVE WRITE POLICY AND ENHANCED LONGEVITY

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with an adaptive write policy, which may enable enhanced disk drive longevity, among other aspects. In particular, in various examples, an adaptive write policy of this disclosure may enable greater head longevity and improved disk drive lifetime, among other advantages.

A write policy may include policies for write parameters, and may typically be set in the factory during factory initialization and optimization processes, as part of finishing the manufacture and preparation of a new disk drive. A write policy may be intended to optimize parameters and factors such as fly height of the read/write heads, that is, the spacings between the heads and the corresponding disk surfaces during write operations, within an overall context of various design and operating constraints and performance goals. The write parameters may affect longevity of the heads, among other factors. For example, a head that comes too close to a disk surface may result in damage to the head and/or the disk surface, which may often be catastrophic and render the disk drive inoperable. Various design and operating parameters may be set with avoidance of head/disk contact as a primary design and operating constraint. A write policy may be set in control circuitry of the disk drive with the goal of intelligently integrating all of such design and operating parameters and constraints within all available information of the design and operating context of the disk drive, to enable ongoing operation that intelligently maintains and pursues overall operating goals for the disk drive.

A disk drive enabled with an adaptive write policy in accordance with aspects of this disclosure may advantageously analyze performance properties of aspects of the disk drive, including the heads, over time, and update one or more aspects of a write policy in adaptive response to such performance properties, among other advantages. A disk drive may update one or more aspects of a write policy in adaptive response to observed performance properties iteratively over time, in various examples. As one illustrative example, a disk drive implementing an adaptive write policy in accordance with aspects of this disclosure may enable adjustments of head fly height that enable greater longevity for the disk drive while maintaining read/write margins or other factors of read/write performance within certain selected specifications and requirements, in various examples.

Various illustrative aspects are directed to a data storage device. The data storage device comprises one or more disks; an actuator mechanism comprising one or more heads, and configured to position a head among the one or more heads proximate to a disk surface among the one or more disks; and one or more processing devices. The one or more processing devices are configured to: measure a read quality of a location on the disk surface; modify a refresh frequency for performing refresh writes at the location, based at least in part on the read quality at the location; in response to the refresh frequency at the location becoming stabilized, determine a selected integrated track interference (xTI) per write metric at the location; and, in response to determining that the selected xTI per write metric at the location is below a selected threshold for the selected xTI per write metric, modify an operating parameter of the head at the location to improve a selected longevity metric.

Various illustrative aspects are directed to a method comprising measuring, by one or more processing devices, a read quality of a location on the disk surface. The method further comprises modifying, by the one or more processing devices, a refresh frequency for performing refresh writes at the location, based at least in part on the read quality at the location. The method further comprises, in response to the refresh frequency at the location becoming stabilized, determining, by the one or more processing devices, a selected integrated track interference (xTI) per write metric at the location. The method further comprises, in response to determining that the selected xTI per write metric at the location is above or below a selected threshold for the selected xTI per write metric, modifying, by the one or more processing devices, an operating parameter of the head at the location to modify a selected metric.

Various illustrative aspects are directed to one or more processing devices. The one or more processing devices comprise means for measuring a read quality of a location on the disk surface. The one or more processing devices further comprise means for modifying, by the one or more processing devices, a refresh frequency for performing refresh writes at the location, based at least in part on the read quality at the location. The one or more processing devices further comprise means for determining, in response to the refresh frequency at the location becoming stabilized, a selected integrated track interference (xTI) per write metric at the location. The one or more processing devices further comprise means for modifying, in response to determining that the selected xTI per write metric at the location is above or below a selected threshold for the selected xTI per write metric, an operating parameter of the head at the location to modify a selected metric.

Various further aspects are depicted in the accompanying figures and described below, and will be further apparent based thereon.

BRIEF DESCRIPTION OF THE DRAWINGS

Various features and advantages of the technology of the present disclosure are apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

DETAILED DESCRIPTION

Figure 1:
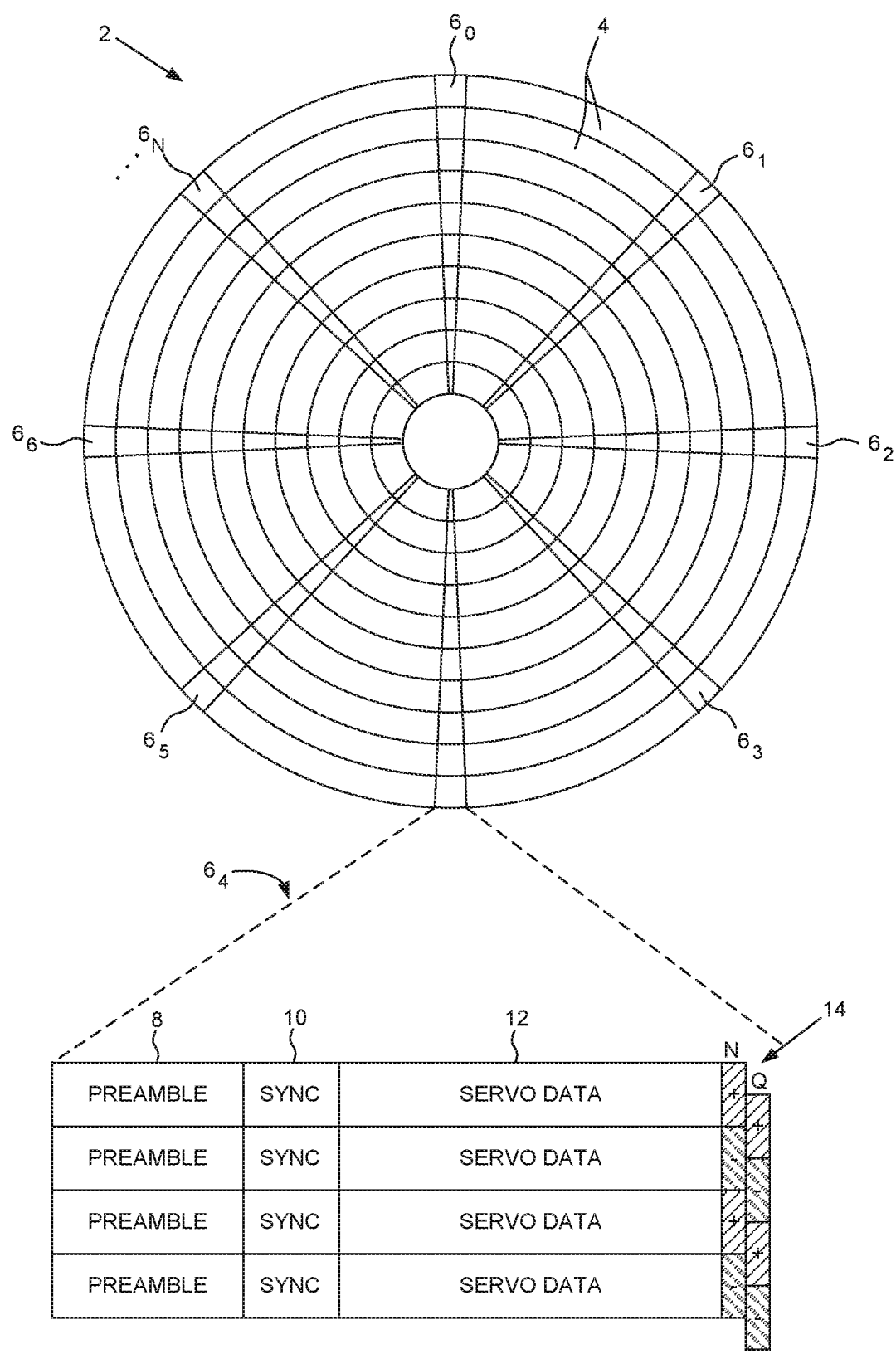
FIG. 1 shows a prior art disk format as comprising a number of radially-spaced, concentric servo tracks defined by servo wedges recorded around the circumference of each servo track.
Figure 2C:
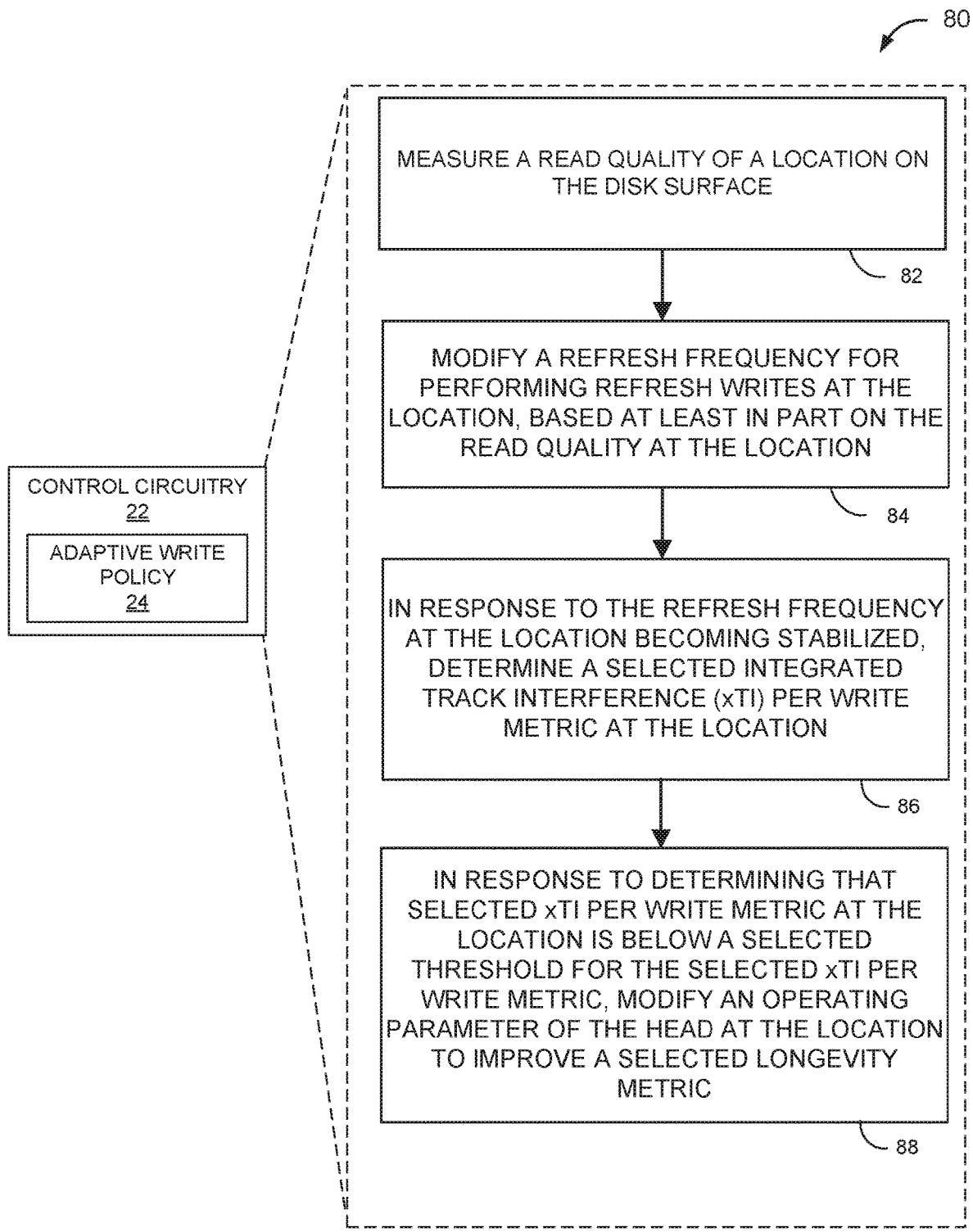
FIG. 2C depicts a flowchart for an example method that one or more drivers of control circuitry of a disk drive may perform or execute in controlling the operations of the disk drive, including the operations of an adaptive write policy module, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that control circuitry 22 of disk drive 15, implementing an adaptive write policy of this disclosure, may perform or execute in controlling the operations of disk drive 15, in accordance with aspects of the present disclosure. Control circuitry 22 may comprise an adaptive write policy module 24 thereof, which may comprise any hardware and/or software involved in implementing, executing, and/or embodying an adaptive write policy in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional, auxiliary actuators or fine actuators, in some examples.

Each of actuator arms 40 is configured to suspend a read/write head 18 ("head 18") in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices. Such device drivers may comprise one or more head drivers, configured for outputting portions of control signal 38 to drive, control, and operate heads 18, including to perform and implement aspects of an adaptive write policy of this disclosure, in various examples. Control circuitry 22 may comprise an adaptive write policy module 24, which may comprise or constitute any configuration of hardware, firmware, and/or software forming any one or more hardware portions of control circuitry 22 and any firmware and/or software executing thereon, that may take part in implementing, embodying, and/or executing an adaptive write policy of this disclosure. Each of heads 18 may comprise a number of active elements to which control circuitry 22 may apply power, such as a write element, one or more thermal fly height control (TFC) elements or other fly height control element, a laser unit in a heat-assisted magnetic recording (HAMR) head, and/or a spin torque oscillation (STO) microwave unit in a microwave-assisted magnetic recording (MAMR) head, for example. Control circuitry 22 implementing or executing adaptive write policy module 24 may modify and otherwise contribute to certain operating parameters of heads 18 such as, for example, modifying fly height of the heads (by any one or more means of modifying fly height), or by modifying power applied to an active element comprised in any of heads 18 or to any one or more active elements, such as by modifying power applied to one or more thermal fly height control (TFC) elements or other fly height control element, power applied to a laser unit in a HAMR head, power applied to an STO microwave unit in a MAMR head, write current applied to a write element (where applying write current is a form of applying power), and/or applied power or other operating parameter for any other active element or otherwise controllable element that may be comprised in heads 18, in various examples.

Adaptive write policy module 24 may be configured among or comprising one or more integrated components of one or more larger-scale circuits, such as one or more power large-scale integrated circuit (PLSI) chips or circuits, and/or as part of control circuitry 22, in various examples. Adaptive write policy module 24 may also be configured as or among or to include one or more components in other large-scale integrated circuits such as system on chip (SoC) circuits, or as or among or to include more or less stand-alone circuits, which may be operably coupled to other components of control circuitry 22, in various examples. In various embodiments, adaptive write policy module 24 may include plug-in logic having multiple stages, as described with respect to at least FIG. 2C and FIG. 3.

Primary actuator 20 may perform primary, macroscopic actuation of a plurality of actuator arms 40, each of which may suspend one or more read/write heads, e.g., heads 18A, over and proximate to corresponding disk surfaces of disks 16. The position of the read/write heads, e.g., heads 18A, are indicated in FIG. 2A, although the heads are generally positioned very close to the disk surfaces, and are far too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends the heads 18 of each actuator arm 40 over and proximate to a corresponding disk surface 17, enabling each set of heads 40 to write control features and data to, and read control features and data from, its respective, proximate disk surface 17. In this sense, each head 18 of each actuator arm 40 interacts with a corresponding disk surface 17. Each head 18 writes to and reads from its corresponding disk surfaces 17 under the positioning control of the actuators of actuator arm assembly 19, comprising primary actuator 20, in this example, and potentially additional fine actuators, which may be controlled by control circuitry 22, in various examples.

The term "disk drive surface" may be understood to have the ordinary meaning it has to persons skilled in the applicable engineering fields of art. The term "disk drive surface" may be understood to comprise both the very outer surface layer of a disk drive as well as a volume of disk drive matter beneath the outer surface layer, which may be considered in terms of atomic depth, or (in a greatly simplified model) the number of atoms deep from the surface layer of atoms in which the matter is susceptible of physically interacting with the heads. The term "disk drive surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples.

The operations of control circuitry 22 implementing an adaptive write policy of this disclosure may be discussed below in terms of a single example head 18A and its single corresponding disk surface 17A, and at a particular location on disk surface 17A, as representative examples of operations with any of the heads 18 and disk surfaces 17 of disk drive 15. In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15, such as a head driver outputting driver currents to head 18A, including to operate components thereof, such as a write element, one or more thermal fly height control (TFC) elements, a laser unit, or other powered components in various examples, as further detailed below.

In particular, adaptive write policy module 24 of control circuitry 22 may modify certain operating parameters of head 18A in novel ways to achieve advantages such as to increase reliability and longevity of head 18A, disk surface 17A, lubricant on disk surface 17A, and/or disk drive 15 overall, in various embodiments. Operating parameters of head 18A that may affect head longevity and which may be controlled and modified may include, e.g., overall fly height of head 18A (which may depend on multiple parameters and effects), power applied to one or more thermal fly height control (TFC) elements (a primary parameter for determining fly height), power applied to a laser unit in a heat-assisted magnetic recording (HAMR) head, power applied to a spin torque oscillation (STO) microwave unit in a microwave-assisted magnetic recording (MAMR) head, write current applied to a write element, and/or applied power or other operating parameter for any other active element that may be present in the head, in various examples, and as further explained below.

Control circuitry 22 may comprise one or more processing devices configured to implement, embody, and/or execute adaptive write policy module 24 in various examples of this disclosure. Control circuitry 22 may iteratively perform a process of analyzing and correcting for track interference by performing refresh writes, performing ongoing analysis of data read quality, and modifying refresh rates with the benefit of feedback from the iterative analysis of data read quality over iterative refresh writes, to aim for a balanced refresh rate and nominal read strength, in various examples, as further explained below, and which may be referred to as an xTI feedback refresh process. The refresh rate may come to stabilize as a result of this xTI feedback refresh process.

Control circuitry 22 may then, in response to the refresh rate stabilizing from the xTI feedback refresh process, make a broader, overall analysis and/or comparison of how various performance goals are affected by the refresh write process at that initial stabilized refresh rate due to the xTI feedback refresh process alone. Control circuitry 22 may then modify one or more operating parameters to enhance or optimize among those various performance goals, which may increase one or more metrics of longevity of head 18A and/or disk drive 15 as part of a constrained optimization that may achieve greater overall performance with respect to multiple competing performance goals of disk drive 15, in various examples, and as further described below. This modifying of one or more parameters to optimize among a total set of performance goals, such as by modifying or improving longevity, after the initial stabilization of the refresh rate, is thus adaptive to the observed performance properties at the initial stabilized refresh rate, and is comprised in an adaptive write process, as may be distinguished from the xTI feedback refresh process. Improving the selected longevity metric may comprise increasing one or more of an estimated longevity of the head and an estimated longevity of the data storage device, in various examples. In other examples, control circuitry 22 may optimize another parameter, such as enhancing write strength, which may be in response to determining an xTI per write metric is either above or below a selected threshold for the selected xTI per write metric, in a tradeoff that may also involve modifying or affecting longevity, including either gaining or losing some predicted and/or actual longevity, while improving or optimizing another one or more parameters, such as write strength, in different examples. In some examples, control circuitry 22 may thus modify, in response to determining that selected xTI per write metric at the location is above or below a selected threshold for the selected xTI per write metric, an operating parameter of the head at the location to modify a selected metric.

As noted, these processes involve correcting for track interference. Track interference involves write operations to one data track interfering with and damaging other data tracks, including adjacent, near, and far tracks, relative to a track being written. Interference at each of these distances may respectively be referred to as adjacent track interference (ATI), near track interference (NTI) and far track interference (FTI). Track interference integrated across all of these distances, or ATI, NTI, and FTI collectively, may be referred to as integrated track interference, or xTI (where "x" may stand for any distance category). The cumulative or integrated damage by xTI can become more or less aggravated along different tracks and at different locations on disk surface 17A, including due to imperfections in the precision with which tracks are written. Tracks are not necessarily written perfectly straight (in small scale approximation, or perfectly radial when considered on the larger scale) or with perfectly even write signal strength or perfectly even effective track width. Different locations of disk surface 17A may have different levels of read quality due to effects such as different levels of xTI damage at the different locations.

Control circuitry 22 may measure a read quality of a location on disk surface 17 (82), such as a section of one or more tracks on disk surface 17. Control circuitry 22 may measure the read quality of the location on disk surface 17 as part of an xTI feedback refresh process, and may also perform a refresh write (e.g., an xTI refresh write) to the location as part of the xTI feedback refresh process, before or after measuring the read quality of the location in a particular iteration, in some examples. Control circuitry 22 may perform a plurality of iterations of the xTI feedback refresh process, and may perform a plurality of iterations of the measuring the read quality of the location on the disk surface and the modifying the refresh frequency for performing refresh writes at the location based on the read quality at the location, in various examples. Control circuitry 22 performing each of the iterations may thus comprise control circuitry 22 measuring the read quality of the location and potentially performing a refresh write to the location, in various examples.

The refresh frequency may be based on a determined xTI damage multiplier, and may be designed to perform refresh writes at a nominal schedule for nominally overcoming xTI damage. Control circuitry 22 may perform refresh writes during more or less idle time in the operations of disk drive 15, and may occupy a small proportion of time, such as in the approximate range of 1% to 3% of the time for disk drive 15 in various examples, and approximately 2% of the time in some examples. Control circuitry 22 may modify the refresh frequency for performing refresh writes at the location on disk surface 17, based at least in part on the read quality at the location on disk surface 17 (84). For example, if control circuitry 22 detects the read quality at the location to be better than nominally expected, control circuitry 22 may reduce the refresh frequency for the location, while if control circuitry 22 detects the read quality at the location to be worse than nominally expected, control circuitry 22 may increase the refresh frequency for the location. Control circuitry 22 may be further configured to perform each of the iterations at the refresh frequency as modified in the previous iteration, that is, in an immediately previous of the iterations, in various examples.

The refresh frequency at the location may become stabilized after a plurality of such iterations, in various examples. For example, if control circuitry 22 has iteratively detected the read quality at the location to be better than nominally specified or expected and iteratively reduced the refresh frequency, the read quality may, at the reduced refreshed frequency, converge to nominally specified read quality. Inversely, if control circuitry 22 has iteratively detected the read quality at the location to be relatively worse than nominally expected and iteratively increased the refresh frequency, the read quality may, at the increased refreshed frequency, converge to nominally specified read quality. In either case, if any modification to refresh frequency has induced any overshoot over or under nominal read quality, or may be predicted to induce any overshoot, in detected read quality from below to above or from above to below nominally expected read quality, or if any other second-order effects are detected, control circuitry 22 may compensate accordingly with finer levels of modifications to dampen any oscillations around nominal read quality, in various examples.

Control circuitry 22 may thus, in various examples, pursue modifications to the refresh frequency to stabilize the refresh frequency. The refresh frequency may be considered a "stabilized" refresh frequency once it has become stable or constant to within a nominal precision, a nominal margin, or a nominal set of error bars as measured, for example.

Control circuitry 22 may, in response to the refresh frequency at the location on disk surface 17 becoming stabilized, determine a selected integrated track interference (xTI) per write metric, or a selected metric of xTI per write, at the location on disk surface 17 (86). Control circuitry 22 may determine the selected metric of xTI per write at the location on disk surface 17 based at least in part on the stabilized refresh frequency, in various examples. Control circuitry 22 may determine an xTI per write metric, such as xTI per write (or xTI damage per write), or a metric that is correlated with xTI per write, at the stabilized refresh frequency. Control circuitry 22 may use a correlated metric based on xTI per write as the selected xTI per write metric, such as in terms of data input/output performance, which may be affected by or be correlated with xTI per write. Control circuitry 22 may, in response to determining that selected xTI per write metric at the location is below a selected threshold for the selected xTI per write metric, modify an operating parameter, or one or more operating parameters, of head 18A at the location to improve a selected longevity metric (88), such as increasing one or more of an estimated longevity of head 18A and an estimated longevity of disk drive 15. This modifying of one or more operating parameters of head 18A after the initial refresh rate stabilization and in response to determining that selected xTI per write metric at the location is below a selected threshold for the selected xTI per write metric may thus form part of an adaptive write process of this disclosure.

An xTI per write metric may be considered and measured in terms of readability of data or data read performance between refresh operations, a degree of xTI damage per write, and/or an xTI damage multiplier, in various examples. For example, the selected threshold for the selected xTI per write metric may be set in terms of selected read/write margins for a given use case, user, or context, in various examples. Read/write margins may be, for example, margins of data signal quality in writing data to and reading data from disk surface 17A, in various examples.

In some examples, the selected xTI per write metric comprises net xTI per write at the location. In some examples, the selected xTI per write metric comprises a metric of modification per write of data input/output performance at the location. The selected xTI per write metric may also be further based at least in part on a risk factor for the location. The risk factor for the location may comprise a determination of net xTI per write that is not accounted for in the read quality at the location at the stabilized refresh frequency, and wherein improving the selected longevity metric may comprise reducing the risk factor for the location.

Control circuitry 22 may take a number of factors into account in controlling the operating parameters of head 18A over time, as well as factors specific to an adaptive write policy of this disclosure. Control circuitry 22 may implement such modifying of one or more operating parameters of head 18A at any particular location on disk surface 17A to improve one or more selected longevity metrics, as part of an adaptive write policy of this disclosure, which may include modifications or terms in addition to or superimposed upon other, pre-existing controls of operating parameters of head 18A. Control circuitry 22 implementing an adaptive write policy of this disclosure may modify default or nominal settings in one or more operating parameters of head 18A, in various examples. Control circuitry 22 implementing an adaptive write policy of this disclosure may modify a level of read quality that is set as the nominal level of read quality, in various examples, as further detailed below.

Modifying one or more operating parameters of head 18A at a given location to improve performance in one performance metric may at the same time reduce performance in a different performance metric. This may be part of a complex set of tradeoffs, as part of a complex constrained optimization. For example, modifying one or more operating parameters of head 18A at a given location to improve performance in one performance metric such as estimated longevity of head 18A and/or disk drive 15, may at the same time reduce performance in a different performance metric such as reducing write and/or read strength, increasing net xTI per write, increasing xTI refresh frequency at the location, and/or reducing data input/output rate at that location. Control circuitry 22 implementing adaptive write policy module 24 may seek to optimize among these various operating parameter constraints adaptively over time. Adaptive write policy module 24 may include an initial write policy for how to optimize among these various operating parameter constraints, and policy rules, techniques, or methods for adapting the write policy for how to optimize among these various operating parameter constraints over time. In adapting the write policy over time in accordance with an adaptive write policy module 24 of this disclosure, control circuitry 22 may assess how to optimize each controllable parameter with reference to various performance criteria for disk drive 15 and various aspects thereof.

The performance criteria may be set to selected settings by or for a particular user or other particular context or use case (e.g., for use in a particular cloud data center), in various examples. Different performance criteria may have different general characteristics. For example, one or more performance criteria may have a capped or discontinuous performance goal, whereas another one or more performance criteria may have an uncapped or continuous or unlimited performance goal. As one example, data read/write speed (which may be defined in any of various manners generally as a measure of speed of writing data to disk surface 17A and reading data from disk surface 17A) may be assessed relative to a capped or discontinuous or "pass/fail" criterion, such as a selected target read/write speed, such that if disk drive 15 writes and reads data at at least the selected target read/write speed, the read/write speed is "good enough" and passes or fulfills the criterion. Control circuitry 22 implementing adaptive write policy module 24 may in this case seek to optimize among all applicable controllable parameters and this and all other applicable performance criteria in order to maintain the read/write speed at least the selected target read/write speed, and otherwise to optimize controllable parameters in available parameter ranges to maximize unlimited performance characteristics or push unlimited performance characteristics to their highest performance levels possible in other, unlimited criteria. In other words, control circuitry 22 may trade off "extra" performance beyond a threshold criterion in a capped performance goal, such as a target read/write speed, where extra performance doesn't contribute any further to any measured performance goals as defined by the selected performance criteria, to achieve greater performance in an uncapped performance goal, where there is no criterion threshold, but rather, the better the performance is, the more it contributes, without limit, to measured performance goals as defined by the selected performance criteria.

As a specific example, control circuitry 22 may make tradeoffs in controllable parameters that would contribute to extra read/write speed beyond a selected threshold target of read/write speed, to instead achieve greater longevity of head 18A and of disk drive 15, where the selected performance goals specify greater longevity as a performance goal without limit: the greater the longevity of disk drive 15, the better, in this example, and where certain controllable parameters may have opposing influences toward either higher read/write speed or greater longevity of head 18A and disk drive 15, within reasonable ranges. Any other sets of performance goals, with and/or without threshold limits, may also be specified, in other examples.

One example of a controllable parameter that may have a reasonable operating range within which one end of the range better promotes read/write speed and the other end of the range better promotes head longevity, is fly height: lower fly height may promote faster read/write speed while posing greater long-term statistical risk of head-disk contact between head 18A and disk surface 17A, catastrophic failure of head 18A, and total failure of disk drive 15; while higher fly height may promote greater prevention against long-term risk of head-disk contact and disk drive failure, at some expense to strength of read/write speed, within a reasonable optimization range. As another example of a controllable parameter that may have a reasonable operating range within which one end of the range better promotes read/write speed and the other end of the range better promotes head longevity, power or current (which may collectively, colloquially be referred to as "power" hereafter, with the understanding that this may refer to power that control circuitry 22 may apply to head 18A as a selected power, as a selected current, or otherwise) applied to a laser unit in a HAMR head implementation of head 18A may have a reasonable operating range, within which a lower power within the reasonable range may tend to promote better risk prevention and greater longevity, at some expense to write speed (and thereby contribute to measures of overall read/write speed), while power at a higher end of a reasonable operating range may tend to promote stronger write strength and more reliable write operations and thereby faster write speed, while it may pose some increased long-term risk of long-term non-reversing mechanical deformation and/or chemical degradation of head 18A, and thus of long-term risk of failure of head 18A and of disk drive 15. Control circuitry 22 may employ various control techniques to optimize control within these reasonable ranges, and may employ an adaptive write policy of this disclosure in addition to, or superimposed upon, determinations of these parameters in accordance with other techniques.

An adaptive write policy of this disclosure may thus optimize among multiple performance criteria that may have asymmetrical determinants of nominal performance, where a first set of one or more performance criteria are capped and have a range of values up to a selected threshold that are "good enough," which may be the case for read/write speed, in some examples; and a second set of one or more performance criteria that are continuous, such that there is no set threshold of "good enough" but rather, the goal is to get the performance measure as high as possible, without limit, such as for longevity of disk drive 15. Thus, even if and when an adaptive write policy of this disclosure may reduce performance as measured in one or more performance metrics, this may be only within the context of optimizing an overall set of performance characteristics to a combined overall set of performance criteria, within the constraints of inescapable trade-offs among competing performance criteria, so as to more intelligently optimize overall among such trade-offs for the applicable selected performance criteria.

Control circuitry 22 implementing an adaptive write policy of this disclosure may thus detect read/write margins beyond a measured performance goal threshold, and control one or more operating parameters to trade off extra read/write margins beyond a measured performance goal threshold, among overall applicable performance goals and constraints, to improve the lifespan of disk drive 15, in various examples. In addition, disk drive 15 implementing an adaptive write policy of this disclosure may maximize the overall lifetime of disk drive 15 while minimizing the impact to nominal specifications (e.g., as may be determined by a given usage context or user in terms of, e.g., data read/write throughput rate or latency), in various examples.

Control circuitry 22 implementing adaptive write policy module 24 may adjust head parameter settings to improve head longevity by identifying extra read/write margins, and reducing and trading off against those extra read/write margins to achieve greater performance against other criteria such as disk drive longevity, while ensuring the read/write margins remain performing within specified pass/fail criteria. Modifications of the parameters described herein may affect both write performance and head longevity, in which write strength and head longevity may have an inverse relationship, due to various factors. For example, modifying a parameter to increase head longevity may result in a reduction of write strength, in various examples.

There are a number of controllable operating parameters for head 18A. Control circuitry 22 may make certain modifications to head parameter settings, such as parameters that control fly height of the head, such as power applied to one or more thermal fly height control (TFC) elements of head 18A, in various examples. The fly height control and applied TFC power are examples of parameters that may potentially affect longevity of the head and that the control circuitry 22 can treat as adjustable parameters in the adaptive write policy. For example, a head may include one or more discrete TFC elements to which power may be applied as a current, which may be referred to as a write back-off (WBO) current. The TFC element may deform or change shape in a controlled manner proportionally to current applied, thereby changing the aerodynamics of the head to raise its fly height above the disk surface. As noted, a lower flight height may promote a stronger write and read strength, but higher long-term risk of head-disk crash and failure of disk drive 15. By modifying this parameter as part of an adaptive write process after a refresh rate has stabilized and if control circuitry 22 determines that head 18A is operating with extra read/write margins relative to a discrete read/write speed criterion, control circuitry 22 may space head 18A farther away from disk surface 17A and thus improve statistically likely head longevity, at the tradeoff of a slight reduction in read/write strength and read/write speed that carries no weight in the specified total performance criteria.

Control circuitry 22 may also control other parameters that may potentially affect longevity of the head and that control circuitry 22 may treat as modifiable parameters in the adaptive write policy. These parameters may also include, e.g., power applied to a laser unit in a HAMR head, power applied to a spin torque oscillation (STO) microwave unit in a MAMR head, write current applied to a write element, and/or applied power or other operating parameter for any other active element or otherwise controllable element that may be comprised in heads 18, in various examples. For example, in HAMR, the head may include a nano-scale laser unit that emits a laser via a waveguide to a near-field transmitter (NFT) and induces a nano-scale plasmon that heats a precision nano-scale track of the disk surface just ahead of the electromagnetic write head for just long enough to enable the magnetic domains of the disk surface to be written to, before re-cooling to stably maintain the magnetic domains encoding the data along the written track. Within a reasonable operating range of power or current applied to the HAMR laser unit, a higher level of power or current applied to the HAMR laser unit may promote a stronger write and read strength, but may pose some increased long-term risk of long-term non-reversing mechanical deformation and/or chemical degradation of head 18A, and thus of long-term risk of failure of head 18A and of disk drive 15. If, after the refresh rate has initially stabilized, control circuitry 22 determines that head 18A is operating with extra read/write margins relative to a discrete read/write speed criterion, control circuitry 22 may reduce current applied to a HAMR laser unit, within a reasonable and effective range, as a modifiable operating parameter of head 18A, which may reduce the laser intensity and reduce the energy and heat applied to the laser unit, waveguide, NFT, and surrounding portions of head 18A, and thus reduce long-term risk of non-reversing mechanical and/or chemical degradation of head 18A and improve statistically likely longevity of head 18A and disk drive 15, at the tradeoff of a slight reduction in read/write speed but that does not carry weight in the specified total performance criteria.

Thus, in various examples, control circuitry 22 may be configured such that control circuitry 22 modifying an operating parameter of head 18A at the location on disk surface 17A may comprise control circuitry 22 increasing a default fly height of the head at the location. In various examples, control circuitry 22 modifying an operating parameter of head 18A at the location on disk surface 17A may comprise control circuitry 22 modifying power applied to a thermal fly height control (TFC) unit. Control circuitry 22 may modify power to one or more TFC units in either direction to increase longevity of head 18A, in different operating contexts; increasing power applied to TFC units may raise the fly height, which may increase longevity, in various examples, while reducing power applied to TFC units may also reduce long-term mechanical and/or chemical degradation of head 18A, which may increase longevity, in various examples; which effect is dominant may depend on a particular use case and/or a particular disk drive. In various examples, control circuitry 22 modifying an operating parameter of head 18A at the location on disk surface 17A may comprise control circuitry 22 reducing power applied to a HAMR laser unit. In various examples, control circuitry 22 modifying an operating parameter of head 18A at the location on disk surface 17A may comprise control circuitry 22 reducing power applied to a MAMR microwave unit. In various examples, control circuitry 22 modifying an operating parameter of head 18A at the location on disk surface 17A may comprise control circuitry 22 reducing power applied to a write element. Reducing power applied to a MAMR microwave unit or to a write element may also reduce differential energy and thermal applications to head 18A over time, may reduce long-term mechanical and/or chemical degradation of head 18A over time, and may thus reduce long-term risk of failure of head 18A and may increase the longevity of head 18A and of disk drive 15.

In various examples, control circuitry 22 modifying an operating parameter or one or more operating parameters of head 18A at the location on disk surface 17A may comprise control circuitry 22 applying a differentialized set of modifications of two or more operating parameters of the head. Control circuitry 22 may assess how modifying multiple of the applicable operating parameters of head 18A may optimally fulfill all applicable performance criteria, and make those multiple applications. For example, in a HAMR head, control circuitry 22 may reduce power applied to a laser unit and to a write element, and increase a fly height. Control circuitry 22 may optimize among these multiple parameter modifications, depending on details of how they may affect a particular disk drive 15 and in a particular operating context, in various examples.

Control circuitry 22 implementing adaptive write policy module 24 may monitor read/write margins by, for example, monitoring data read/write speed and latency. For example, once the read/write margins become stable, control circuitry 22 implementing adaptive write policy module 24 may monitor degradation of adjacent data tracks due to all-distance integrated track interference (xTI). This can be accomplished, for example, by monitoring metrics of read quality such as data recovery (read) depth, or signal to noise ratio (SNR) or amplitude of the read signal, for example. For example, control circuitry 22 implementing adaptive write policy module 24 may monitor the signal quality at refresh in addition to other metrics such as a summation of data read depth to determine that performance and latency are within certain desirable ranges. A reduced read signal quality may signify xTI track damage or other quality issues occurring during read operations. The data read depth may signify a strength of a write signal, which may approximate a tail latency or be proportional to a read signal during a read operation. Measuring the read quality may thus comprise measuring the read quality in terms of one or more of: data recovery depth of reads of the location, signal-to-noise ratio of reads of the location, and amplitude of reads of the location, in various examples.

Control circuitry 22 implementing adaptive write policy module 24 may also assign a risk factor multiplier based on performance and latency of a location of disk surface 17A. For example, the risk factor multiplier may be a number indicative of a disk failure or read/write margins being outside or within desirable limits. More specifically, as part of initial factory settings, control circuitry 22 may initially be assigned a risk factor multiplier of 1, for example, which may be intended to indicate that data throughput and latency, and read/write margins, are within specifications for an intended use case, user, or operating context. The refresh rate may be based at least in part on the risk factor multiplier, so the initial default refresh rate may be based on the initial default factory setting risk factor multiplier. Factory setting of write parameters may incorporate assumptions about field operating conditions (e.g., temperature, vibration, workload etc.) of disk drive 15. Control circuitry 22 implementing adaptive write policy module 24 of this disclosure may subsequently determine those initial factory setting specifications of field operating conditions, and the specified risk factor multiplier based thereon, to be overly conservative, and potentially based on worst-case corner case scenarios that control circuitry 22 implementing adaptive write policy module 24 may determine do not materialize under actual operating conditions. Control circuitry 22 may determine that the initial risk factor multiplier results in extra read/write margins and/or higher refresh rate than needed to meet the specified read/write speed criterion, and may decrease the risk factor multiplier, which may be part of modifying the refresh rate.

Control circuitry 22 implementing adaptive write policy module 24 may gather and use feedback to make modifications to operating parameters of head 18A. For example, after xTI per write or other metric reaches a steady state and the refresh rate has become stable for a specific location of disk drive surface 17A, control circuitry 22 may assess the risk factor multiplier and/or other values indicative of risk for that specific location of disk drive surface 17A and calculate an effective measure of the overall damage done by one write in that location, which may be referred to as theta. If that theta value is above a selected threshold, this implies that the data read/write speed performance at that location on the disk exceeds specified performance, and has a low frequency of xTI refreshes relative to specified criteria. In this case, control circuitry 22 may adjust one or more of the operating parameters of head 18A (e.g., fly height, laser power) for writing in that location in a way that may reduce write speed or read/write speed to shed unneeded, extra performance beyond goal criteria in write speed or read/write speed, while improving longevity of head 18A and disk drive 15.

With decreased write quality and read/write speed, while remaining within specified values and without negatively impacting measured performance criteria for write quality and read/write speed, the risk factor multiplier and refresh rate may increase, and theta may decrease. Since performance in that location exceeded a specified target for read/write speed, the result may be an improvement in reliability in terms of reduced long-term risk of head failure, at the expense of unneeded performance in read/write speed.

On the other hand, should theta be below the threshold value, this implies that the performance at that location on disk surface 17A falls outside of the specified read/write speed performance and has a high number of xTI refreshes relative to the specified criteria. In this case, control circuitry 22 may modify one or more operating parameters in a way that may improve write quality and read/write speed to within specified performance criteria for write quality and read/write speed. Accordingly, if control circuitry 22 receives feedback that indicates that the read/write margins are within acceptable limits, e.g., the risk multiple is 1 or less, control circuitry 22 may modify one or more operating parameters of head 18A to improve head longevity and improved disk lifetime, while still maintaining the desired read/write margins.

The above processes may be iterative. For example, after control circuitry 22 has made modifications to one or more operating parameters of head 18A for one or more locations of corresponding disk surface 17A, control circuitry 22 may again iteratively assess read/write speed and determine if there remains any extra margin in read/write speed. Control circuitry 22 may continue this process until the read/write speed is just at or within a nominal margin of its pass/fail criterion target, while having fine-tuned the operating parameters to enhance or maximize longevity of head 18A and disk drive 15, in various examples.

While several examples are discussed in terms of control circuitry 22 modifying operating parameters of head 18A at locations of disk surface 17A, these descriptions may be generalized among all of the heads 18 and disk surfaces 17 of disk drive 15. Control circuitry 22 may separately modify any one or more operating parameters for any or all of heads 18 at any or all locations of disk surfaces 17. Thus, control circuitry 22 may oversee, and manage in parallel, many independent processes of refresh rates becoming stable and then performing adaptive write process modifications of operating parameters for any or all of heads 18 operating at and proximate to any or all locations of their corresponding disk surfaces 17, in various examples.

Figures 3A, 3B:
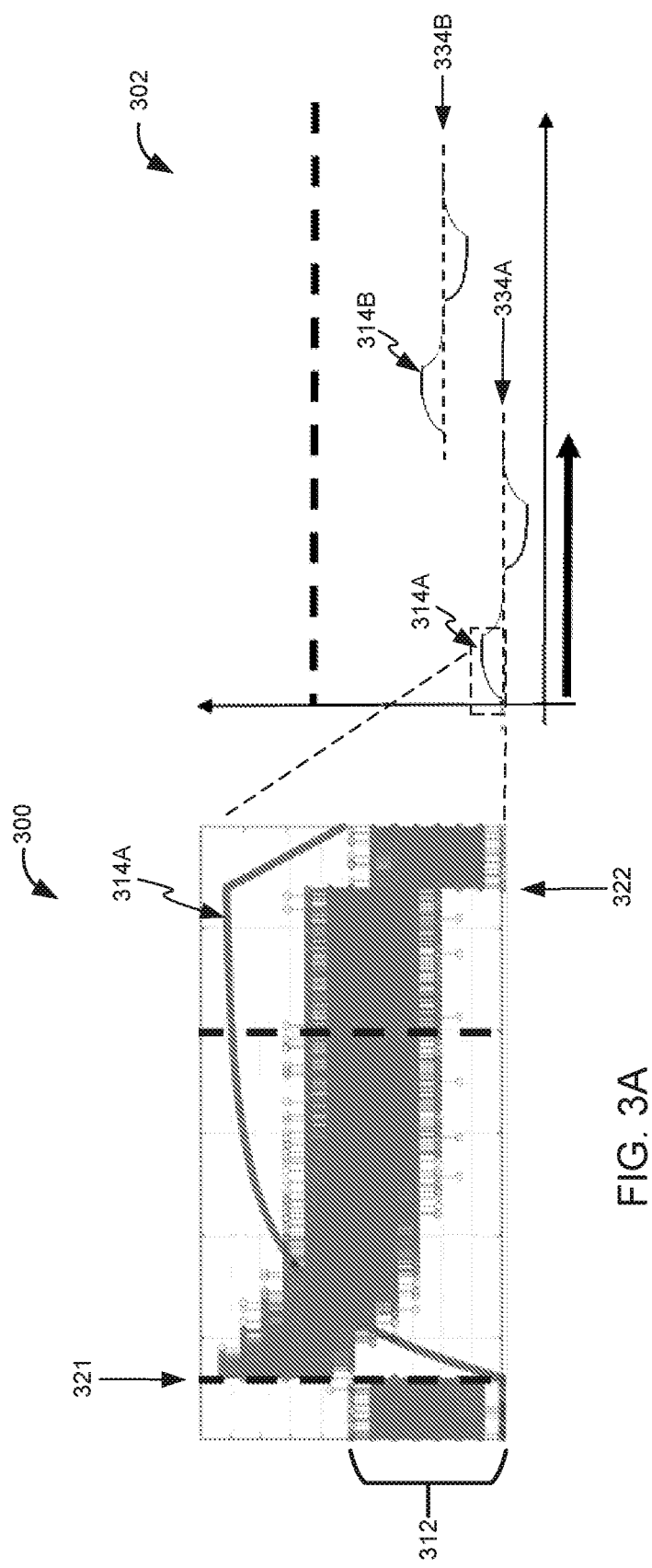
FIGS. 3A and 3B show graphs illustrating a disk drive implementing an adaptive write policy over time, in accordance with aspects of the present disclosure.

FIGS. 3A and 3B show graphs 300 and 302 illustrating a disk drive implementing an adaptive write policy over time, in accordance with aspects of the present disclosure. Graph 300 shows a detailed view of a small portion of graph 302. Graph 300 shows data read quality xTI damage multiplier 312 over time, and refresh frequency 314A over time. Data read quality xTI damage multiplier 312 over time may be as measured by control circuitry 22 at a location, such as a track or set of tracks, on a disk surface. Data read quality xTI damage multiplier 312 is shown in terms of a normalized ascending xTI damage multiplier on the y axis, such that higher values indicate higher error and poorer read quality. In the illustrative example of FIG. 3A, read quality xTI damage multiplier is at a nominal level before time 321, and spikes upward after time 321. This may represent an increased read error response on a track or other location on the disk surface, which may be considered in terms of data recovery depth (DRP steps) or read latency, e.g., the drive may need to re-read a track or other location iteratively to read the data sufficiently from the track or other location, so data retrieval is slower.

Refresh frequency 314A, under the control of control circuitry 22, begins rising asymptotically at time 321, at a rate of increase approximately proportional to an amount by which read quality xTI damage multiplier is above the nominal level over time. As read quality xTI damage multiplier 312 slowly descends back toward the nominal level, refresh frequency 314A moderates its rate of increase. Read quality xTI damage multiplier 312 then drops back down to its nominal level at time 322, in response to which, refresh frequency 314A begins a sharp, asymptotic descent back toward a nominal or default refresh frequency. Refresh frequency 314A over time as shown on graph 300 may thus represent control circuitry 22 modifying the refresh frequency 314A for performing refresh writes at a location, based at least in part on read quality 312 at the location.

FIG. 3B shows graph 302 of an expanded view (relative to FIG. 3A) of refresh frequency and xTI per write over time, for an adaptive write process in accordance with examples of this disclosure. FIG. 3B shows, in the lower left corner of graph 302, an expanded version of graph 300 of FIG. 3A, showing additional detail of refresh frequency 314A being modified, under control of control circuitry 22, in response to changes in a read quality xTI (as shown in FIG. 3A but not shown in FIG. 3B), about an initial nominal default refresh frequency 334A. That is, refresh frequency 314A at a given location may tend to become stabilized at or proximate to or within a nominal margin of refresh frequency 334A. Control circuitry 22 may then, in response to the refresh frequency 314A at the location of disk surface 17A becoming stabilized at initial nominal default refresh frequency 334A, determine a selected integrated track interference (xTI) per write metric at the location, based at least in part on the read quality at the location at the stabilized refresh frequency 334A. Control circuitry 22 may determine whether this xTI per write metric is below a selected threshold for the selected xTI per write metric, such as by assessing read quality and determining whether the read quality is better than it needs to be to fulfill a specified read/write criterion. If control circuitry 22 does detect that the xTI per write metric is below the selected threshold, and thus that the parameters have been tuned to perform writes and reads with extra read/write quality relative to the specified criterion, control circuitry 22 may, in response to determining that selected xTI per write metric at the location is below a selected threshold for the selected xTI per write metric, modify one or more operating parameters of head 18A at the location to improve a selected longevity metric, such as longevity of head 18A and/or of disk drive 15. Control circuitry 22 may do this by modifying one or more operating parameters of head 18A that may reduce read/write strength and speed while reducing long-term risk of damage to head 18A, in various examples, as described herein.

Figure 4:
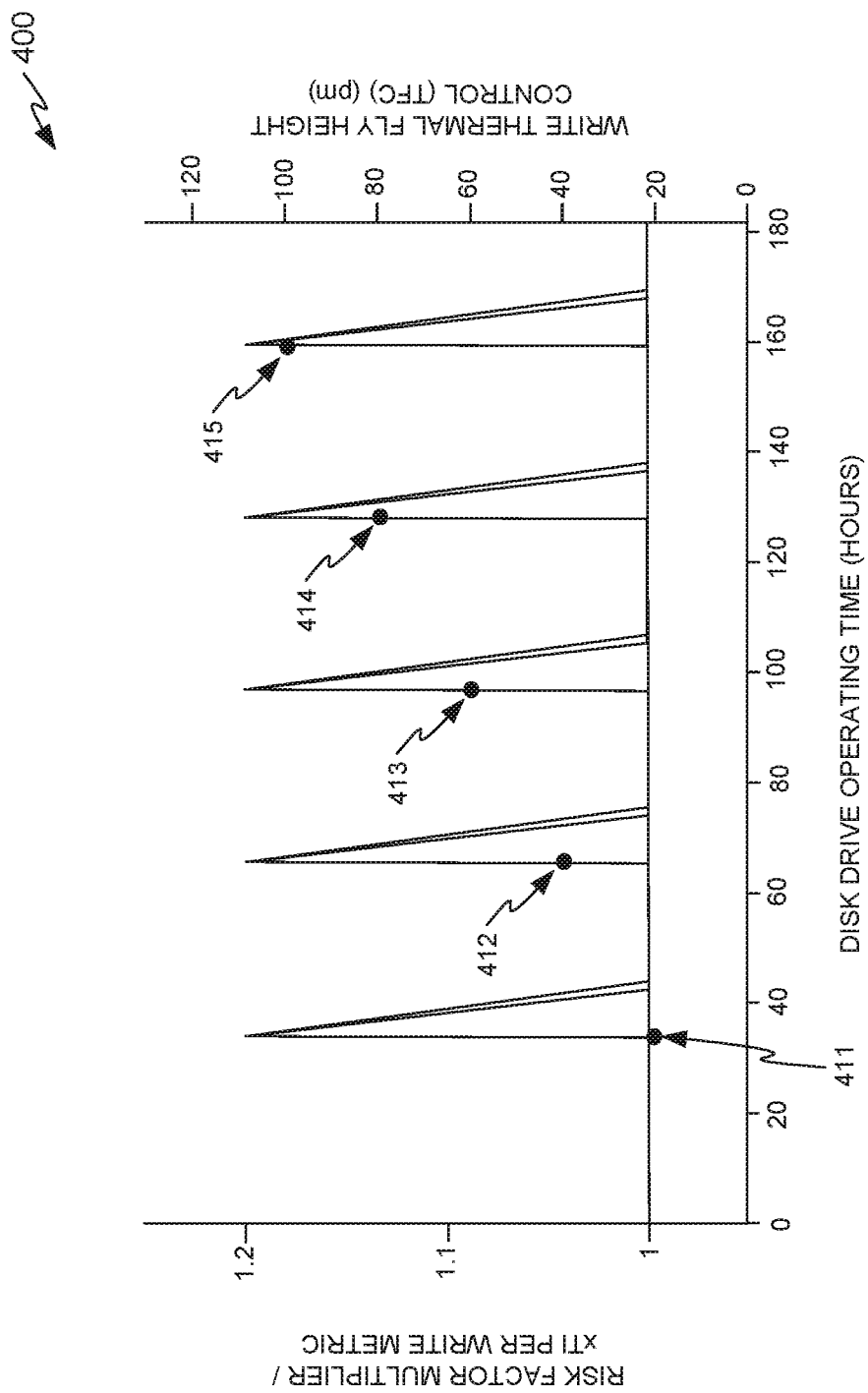
FIG. 4 shows a graph relating to refresh rate stabilization, an xTI damage multiplier, and modification of fly height as an example modification of an operating parameter of a head, in accordance with aspects of the present disclosure.

FIG. 4 shows a graph 400 of a successful tested measurement of an implementation of the present disclosure, relating to refresh rate stabilization, an xTI damage multiplier, and modification of fly height as an example modification of an operating parameter of head 18A, in accordance with aspects of the present disclosure. In FIG. 4, the left-side y-axis represents a risk factor multiplier, which may also be considered an xTI damage multiplier, as an example of an xTI per write metric, in a normalized log scale. The right-side y-axis represents a write TFC pullback adjustment displacement, in picometers (pm) (e.g., fly height of the head above the disk surface). The x-axis represents disk drive operating time, in hours. Points 411, 412, 413, 414, 415 represent fly height over time, as measured on the right-side y-axis. The flat portions of each line, e.g., horizontal lines at risk factor multiplier of 1, represent stabilization of risk factor multiplier, and whereas each spike in the risk factor multiplier represents a temporary safety margin factor of fly height at control resets, coinciding with fly height increase points 411, 412, 413, 414, 415, to ensure that disk surface 17 does not become damaged at a beginning of the disk rotation at a control reset.

As noted above, a risk factor of 1 may be a normalized risk factor (e.g., acceptable risk factor multiplier from the initial factory settings). The risk factor multiplier may comprise or be composited from one or more example individual, subcomponent xTI per write metrics; in the example shown in graph 400, six different xTI bands, forming six different discrete xTI per write metrics, were measured and graphed, and are shown almost completely overlapping; thus, a compounded or averaged version of all six of these xTI bands may also be used and/or referenced as an xTI per write metric, or any one of the discrete components may be used, since they all closely track each other. The "sawtooth" pattern across the graph may thus represent a realtime-measured xTI per write metric referenced to the left-side y-axis. Control circuitry 22 may take the realtime-measured xTI per write metric smoothed over time, or only the steady-state portions and not the height adjustment safety margin spikes, as the effective xTI per write metric, in some examples. The refresh rate may be based on the risk factor multiplier or effective xTI per write metric over time, and may be based on the steady-state portions of the xTI per write metric, in between the safety spikes, in some examples.

As shown by graph 400 of FIG. 4, after each incremental increase in fly height, the risk factor multiplier stabilizes back down to 1, so the refresh rate may also stabilize back to its prior value each time. Control circuitry 22 may either track real-time spikes in xTI per write metric, or ignore temporary spikes in xTI per write metric, in determining refresh rate, in various examples. Graph 400 shows that control circuitry 22 implementing an adaptive write process of this disclosure may modify a fly height iteratively upward a number of times, while still maintaining risk factor multiplier and read/write strength and speed within a specified or required criterion, and without raising refresh rate, in this example. Thus, in this example, control circuitry 22 implementing an adaptive write process of this disclosure becomes enabled to increase longevity of head 18A and disk drive 15 without making any tradeoff in read/write strength and speed, without regard to giving up any margins in those values beyond a specified criterion.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism comprising one or more heads, and configured to position a head among the one or more heads proximate to a disk surface among the one or more disks; and
   one or more processing devices, configured to:
   measure a read quality of a location on the disk surface;
   modify a refresh frequency for performing refresh writes at the location, based at least in part on the read quality at the location;
   in response to the refresh frequency at the location becoming stabilized, determine a selected integrated track interference (xTI) per write metric at the location; and
   in response to determining that the selected xTI per write metric at the location is below a selected threshold for the selected xTI per write metric, modify an operating parameter of the head at the location to improve a selected longevity metric.

2. The data storage device of claim 1, wherein the one or more processing devices are further configured such that modifying the operating parameter of the head at the location comprises increasing a default fly height of the head at the location.

3. The data storage device of claim 1, wherein the head comprises an active element, and wherein the one or more processing devices are further configured such that modifying the operating parameter of the head comprises modifying power applied to the active element.

4. The data storage device of claim 3, wherein the active element comprises a fly height control unit, and wherein the one or more processing devices are further configured such that modifying the operating parameter of the head comprises modifying power applied to the fly height control unit.

5. The data storage device of claim 3, wherein the active element comprises a heat-assisted magnetic recording (HAMR) laser unit, and wherein the one or more processing devices are further configured such that modifying the operating parameter of the head comprises reducing power applied to the HAMR laser unit.

6. The data storage device of claim 3, wherein the active element comprises a microwave-assisted magnetic recording (MAMR) microwave unit, and wherein the one or more processing devices are further configured such that modifying the operating parameter of the head comprises reducing power applied to the MAMR microwave unit.

7. The data storage device of claim 3, wherein the active element comprises a write element, and wherein the one or more processing devices are further configured such that modifying the operating parameter of the head comprises reducing power applied to the write element.

8. The data storage device of claim 1, wherein the one or more processing devices are further configured such that modifying the operating parameter of the head comprises applying a differentialized set of modifications of two or more operating parameters of the head.

9. The data storage device of claim 1, wherein the selected xTI per write metric comprises net xTI per write.

10. The data storage device of claim 1, wherein the selected xTI per write metric comprises a metric of modification per write of data input/output performance.

11. The data storage device of claim 1, wherein improving the selected longevity metric comprises increasing one or more of an estimated longevity of the head and an estimated longevity of the data storage device.

12. The data storage device of claim 1, wherein the one or more processing devices are further configured such that measuring the read quality comprises measuring the read quality in terms of one or more of: data recovery depth of reads of the location, signal-to-noise ratio of reads of the location, and amplitude of reads of the location.

13. The data storage device of claim 1, wherein the one or more processing devices are further configured to:
perform a plurality of iterations of the measuring the read quality of the location on the disk surface and the modifying the refresh frequency for performing refresh writes at the location based on the read quality at the location, and
wherein the refresh frequency at the location becomes stabilized after the plurality of iterations.

14. The data storage device of claim 13, wherein the one or more processing devices are further configured such that performing each of the iterations further comprises performing a refresh write to the location,
wherein the one or more processing devices are further configured to perform each of the iterations at the refresh frequency as modified in an immediately previous of the iterations.

15. The data storage device of claim 1, further wherein determining the selected xTI per write metric at the location is based at least in part on the stabilized refresh frequency.

16. A method comprising:
measuring, by one or more processing devices, a read quality of a location on the disk surface;
modifying, by the one or more processing devices, a refresh frequency for performing refresh writes at the location, based at least in part on the read quality at the location;
in response to the refresh frequency at the location becoming stabilized, determining, by the one or more processing devices, a selected integrated track interference (xTI) per write metric at the location; and
in response to determining that the selected xTI per write metric at the location is above or below a selected threshold for the selected xTI per write metric, modifying, by the one or more processing devices, an operating parameter of the head at the location to modify a selected metric.

17. The method of claim 16, further wherein modifying the operating parameter of the head at the location comprises modifying one or more of:
a default fly height of the head at the location; and
power applied to an active element comprised in the head, wherein the active element comprises one or more of: a fly height control unit, a heat-assisted magnetic recording (HAMR) laser unit, a microwave-assisted magnetic recording (MAMR) microwave unit, and a write element.

18. The method of claim 16, wherein the selected xTI per write metric comprises net xTI per write.

19. One or more processing devices comprising:
means for measuring a read quality of a location on the disk surface;
means for modifying, by the one or more processing devices, a refresh frequency for performing refresh writes at the location, based at least in part on the read quality at the location;
means for determining, in response to the refresh frequency at the location becoming stabilized, a selected integrated track interference (xTI) per write metric at the location; and
means for modifying, in response to determining that the selected xTI per write metric at the location is above or below a selected threshold for the selected xTI per write metric, an operating parameter of the head at the location to modify a selected metric.

20. The method of claim 19, further wherein the means for modifying the operating parameter of the head at the location comprises means for modifying one or more of:
a default fly height of the head at the location; and
power applied to an active element comprised in the head, wherein the active element comprises one or more of: a fly height control unit, a heat-assisted magnetic recording (HAMR) laser unit, a microwave-assisted magnetic recording (MAMR) microwave unit, and a write element.

* * * * *